United States Patent [19]

Roy et al.

[11] 4,110,512

[45] Aug. 29, 1978

[54] IRON OXIDE MATERIAL AND MEMBERS FOR DRY LUBRICATED SYSTEMS INCLUDING THE METHOD OF PREPARATION THEREFOR

[75] Inventors: Amedee Roy; Claude Belleau, both of Troy; James M. Geyman, Harper Woods, all of Mich.

[73] Assignee: Chrysler Corporation, Highland Park, Mich.

[21] Appl. No.: 212,249

[22] Filed: Dec. 27, 1971

[51] Int. Cl.² ............................................. B32B 15/16
[52] U.S. Cl. .................................. 428/469; 148/6.35; 427/11; 427/34; 427/372 R; 427/419 R; 427/419 A; 427/419 B; 427/419 F; 427/423; 427/427; 428/471; 428/472
[58] Field of Search ........ 148/6.35; 308/241, DIG. 9; 117/105.2, 93.1 PF; 252/25; 427/423, 427, 419 R, 419 A, 419 B, 419 F, 372 R, 34, 346, 331, 355, 11; 428/469, 471, 472

[56] References Cited

U.S. PATENT DOCUMENTS

| | | | |
|---|---|---|---|
| 1,333,586 | 3/1920 | Chruchward | 148/6.35 X |
| 2,236,728 | 4/1941 | Given | 148/6.35 |
| 2,387,872 | 10/1945 | Bell | 308/DIG. 9 |
| 2,588,234 | 3/1952 | Henricks | 148/6.15 R |
| 2,903,384 | 9/1959 | Grass et al. | 148/6.35 X |
| 3,142,894 | 8/1964 | Ross et al. | 29/182.5 |
| 3,343,362 | 9/1967 | Lunsford | 148/6.35 X |
| 3,368,970 | 2/1968 | Grunze et al. | 252/25 |
| 3,900,200 | 8/1975 | Nakamura | 428/469 |
| 3,922,444 | 11/1975 | Nakamura | 428/471 |

FOREIGN PATENT DOCUMENTS 752,374  2/1967  Canada.

*Primary Examiner*—Cameron K. Weiffenbach
*Attorney, Agent, or Firm*—Baldwin & Newtson

[57] ABSTRACT

Low friction material particularly adapted for use at high temperatures in the regenerator portion of gas turbine engines, the material comprising a work surface layer on a substrate, the work surface layer prior to a break-in period comprising an iron oxide (wustite—FeO, magnetite—$Fe_3O_4$, or hematite—$Fe_2O_3$) matrix containing an interspersed trapping material in the interstices thereof, the trapping material comprising an inorganic compound such as a salt or oxide; and subsequent to the break-in period, the work surface layer acquires a substantially continuous film of hematite—$Fe_2O_3$ iron oxide in which the hexagonal $Fe_2O_3$ crystals or cells provide a highly oriented structure. Transfer of the oriented film to the mating surface occurs during run-in.

14 Claims, 4 Drawing Figures

IRON OXIDE MATERIAL AND MEMBERS FOR DRY LUBRICATED SYSTEMS INCLUDING THE METHOD OF PREPARATION THEREFOR

BACKGROUND OF THE INVENTION

This invention is concerned in general with materials for minimizing the sliding frictional forces which exist between mating rubbing surfaces. It is also concerned with methods of preparing such materials. Usually, either a lubricating film of oil, graphite, or the like or rolling contact is preferred over dry sliding or rubbing contact when two mating surfaces must move relative to and against each other. If the operating conditions for a set of mating surfaces excludes the use of fluid lubricants, such as oil or graphite, or rolling contact, dry sliding contact may be necessary. Such systems are usually referred to as dry lubricated systems. These systems have been used for example in certain parts of turbine engines, such as in the seals of turbine engine rotary regenerator sections, but may also have use in certain types of bearing systems and particularly in various high temperature environments, typically hostile to oil and graphite lubricants and the like, where dry contacting surfaces must slide over each other, for example in Wankel engines. Such systems usually exhibit both high wear and high friction and ordinarily suffer extensive surface damage such as galling. It is a general object of this invention to provide a new material primarily for use in dry lubricated systems and particularly for high temperature use, the material exhibiting desirable friction and wear characteristics.

The prior art seems to have been aware of the fact that various oxides might be used on mating sliding surfaces with some resultant desirable sliding and rubbing characteristics. In the case of certain mating sliding metal pairs such as iron and steel it has been noted that continuous formation and reformation of oxide film occurs at the surfaces when certain elevated temperatures are reached. This action is sometimes accompanied by a decrease in friction but it usually results in extensive surface damage. It has been further noted that any effect which tends to remove the oxide film thus formed, such as a decrease in temperature, scaling or the like, causes an increase in friction. The iron oxides wustite (FeO), magnetite ($Fe_3O_4$) and hematite ($Fe_2O_3$) have been included among the various oxides studied. For example, a downward trend in the coefficient of friction has been noted for dry steel specimens as a result of the formation of FeO films. This phenomenon has been reported in the *Handbook of Mechanical Wear*, edited by Lipson and Colwell, published by the University of Michigan Press, 1961, at Chapter 3, Page 41. This same reference reported studies made on pre-formed $Fe_2O_3$ and $Fe_3O_4$ oxide films 1200 angstroms thick. The conclusion recorded in this reference at page 45 of Chapter 3 is that $Fe_3O_4$ can be beneficial in decreasing friction and in preventing surface damage while in comparison $Fe_2O_3$ exhibits high friction, excessive welding and a great deal of surface damage. It was, therefore observed at page 55 of this reference that FeO and $Fe_3O_4$ may be generally beneficial under dry lubrication conditions while $Fe_2O_3$ is generally considered unsuitable for such use. This conclusion is in line with the generally accepted fact that $Fe_2O_3$ powder is regarded as an excellent polishing rouge because of its extremely abrasive nature.

U.S. Pat. No. 3,142,894 is of general interest in connection with this invention. The patent issued to S. T. Ross et al. on Aug. 4, 1964 and is an example of a prior art iron oxide turbine seal material. This sintered iron-copper-carbon material is porous and can be oxidized to some depth prior to use to provide a material which forms $Fe_3O_4$ and FeO during service.

SUMMARY OF THE INVENTION

By means of this invention various types of low friction materials and members such as turbine seals and the like may be provided which are particularly useful under high temperature, dry lubrication conditions. A wustite (FeO) magnetite ($Fe_3O_4$) or hematite ($Fe_2O_3$) porous matrix containing interstitial quantities of an interspersed trapping material comprised of an inorganic compound such as an inorganic salt or oxide comprises together a working surface which is carried by a suitable substrate. The iron oxide matrix, during a run-in or break-in period wherein it is rubbed against a mating surface, undergoes abrasion causing loose particles of the iron oxide and other miscellaneous abraded debris, such as particles of the trapping material, to form between the mating surfaces. The particles embed or seat themselves in trapping material and undergo sintering, due to the rubbing and/or frictional heat generated thereby and/or elevated temperature and/or pressure exerted by the mating surfaces, to form a substantially continuous $Fe_2O_3$ film. It has been found that the abraded particles, due to the rubbing contact transform to $Fe_2O_3$ as a result of oxidizing effects and seat themselves in the trapping material in a self-aligned and highly oriented condition with the basal planes of the hexagonal cells or crystals of the $Fe_2O_3$ particles arranged substantially parallel to the rubbing surfaces. The iron tends to fracture along certain crystallographic planes, i.e., the basal planes. The fractured particles align themselves so as to present the lowest resistance to sliding; the trapping material aids this self-alignment. Since the particles are of the same orientation they sinter readily at relatively low temperatures and pressures in situ to form the smooth, substantially continuous film of $Fe_2O_3$. Transfer of the particles and trapping material from one mating surface to the other occurs so as to form a mating continuous film.

There is thus provided at least one but more likely two substantially continuous $Fe_2O_3$ surfaces which according to the invention, have been found to be so beneficial from the wear and friction standpoints under dry lubricated conditions, particularly at high temperatures such as those in excess of 1000° F. Moreover, once formed the material is permanent in that it is self-renewing because as wear proceeds it continues to form at a controlled rate.

The present invention therefore contemplates in general a new material and/or member adapted to be operable in a rubbing, sliding or other frictional relationship, wherein at least one of the materials and/or members incorporates as its rubbing or working surface the anti-friction, anti-wear material according to this invention and the other mating surface either incorporates the same or acquires it during a run-in or break-in period. Such dry lubricated systems, have proven to be operable over a wide temperature range. A specific and preferred application of such a construction is in the regenerator section of gas turbine engines as is described hereinbelow. Operating temperature ranges for such engines may extend from 40° F. below zero at some cold starts to temperatures up to about 1500° F., typically.

The invention also includes methods of preparation of the subject materials, preferably including flame or plasma spraying of the iron oxide matrix and other constituents thereof.

DESCRIPTION OF THE PREFERRED EMBODIMENTS

Figure 1:
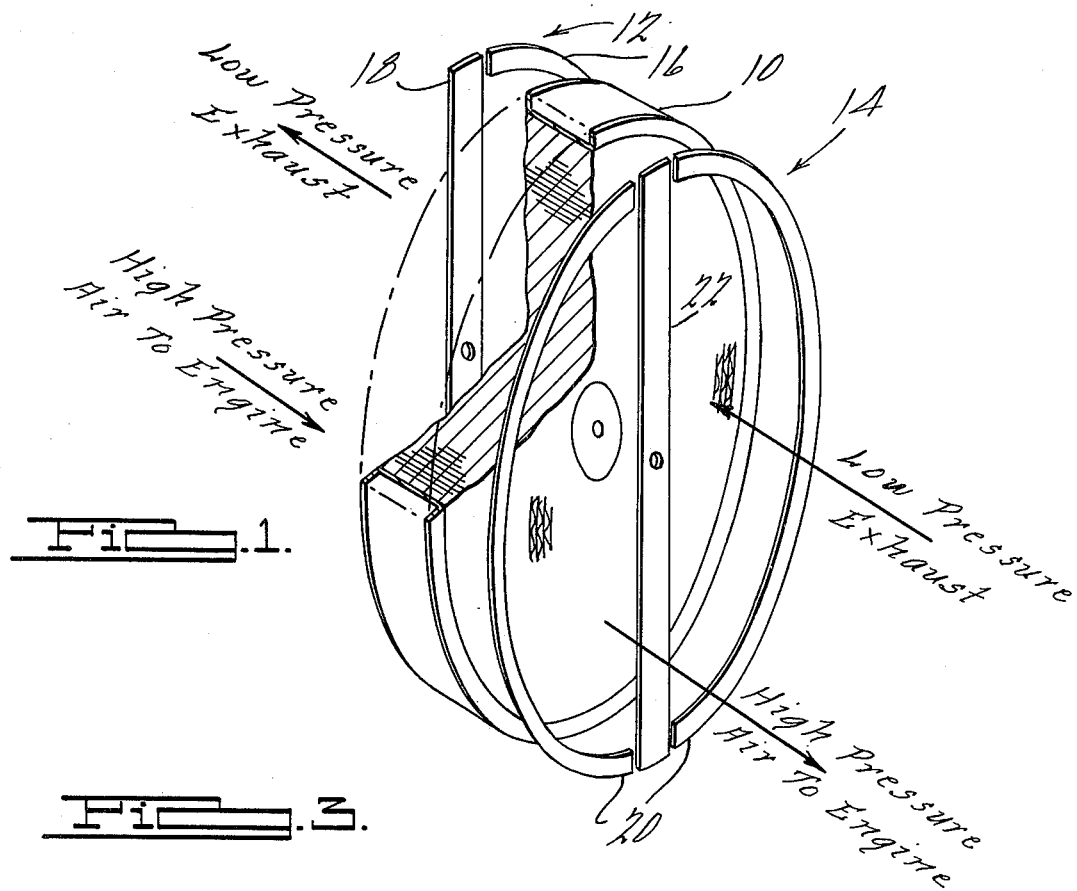
FIG. 1 is a schematic showing of a more or less typical rotary regenerator system for a gas turbine engine including inner and outer seal systems consisting of cross arm seals and peripheral rim seals, all of which may make use of the material according to the present invention.

A typical dry lubricated system which may use the material of this invention is shown in FIG. 1 and consists of a turbine engine rotary regenerator 10, an outer seal system 12 and an inner seal system 14. Regenerator 10 rotates between the seal systems, rubbing against them. Outer seal system 12 includes a cold rim seal 16 and a cold cross arm 18 while inner seal system 14 includes hot rim seals 20 and a hot cross arm 22. The function of the seal system is to prevent the leaking of the high pressure compressed air into the exhausting low pressure gases when the two move through the regenerator as indicated by the arrows in the figure. More specific information concerning the structure and operation of this type of regenerator is available in U.S. Pat. Nos. 3,157,226; 3,190,350; 3,190,351; 3,192,998; 3,202,207; 3,234,999, and 3,273,904. The material of this invention finds its preferred use in the hot cross arm 22 as a specific example. Arm 22 may be made of a stainless steel substrate material such as 430, 442 or 446 stainless steel, other ferritic stainless steels, or other heat resistant materials with proper strength, thermal expansion characteristics relative to the work surface, etc. The exact material of the substrate is not critical to the invention in general although it may be in the case of specific uses. The arm has the substantially continuous $Fe_2O_3$ working surface layer formed after run-in or break-in, according to this invention.

Figure 2A:
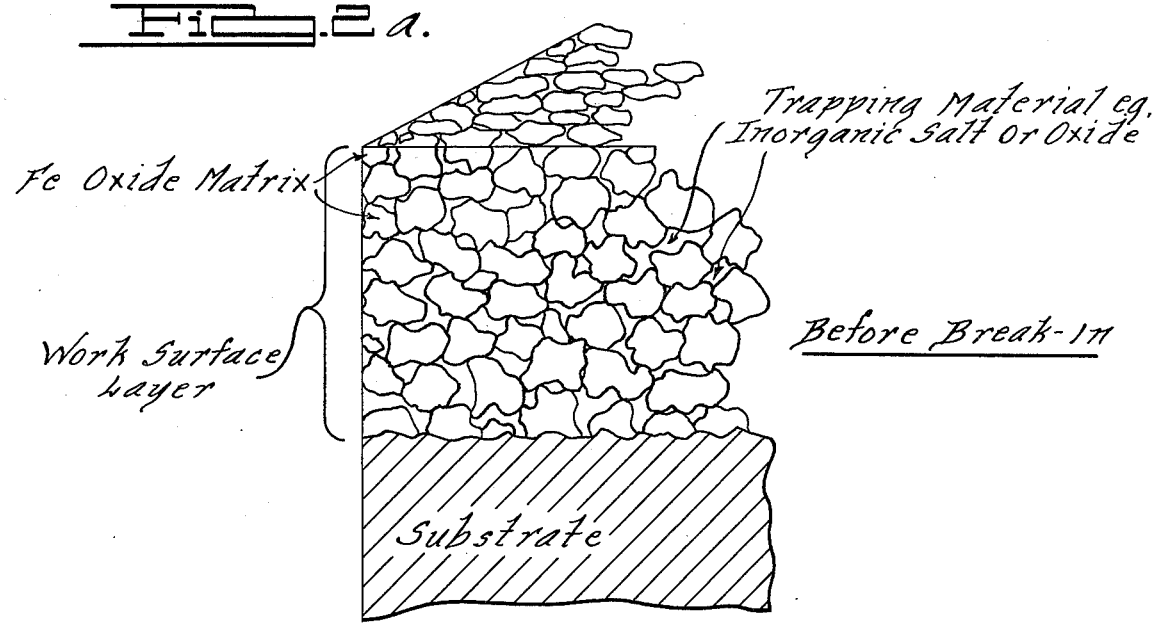
FIGS. 2a and 2b are fragmentary schematics illustrating the structure of the material according to the invention before and after break-in, respectively.
Figure 2B:
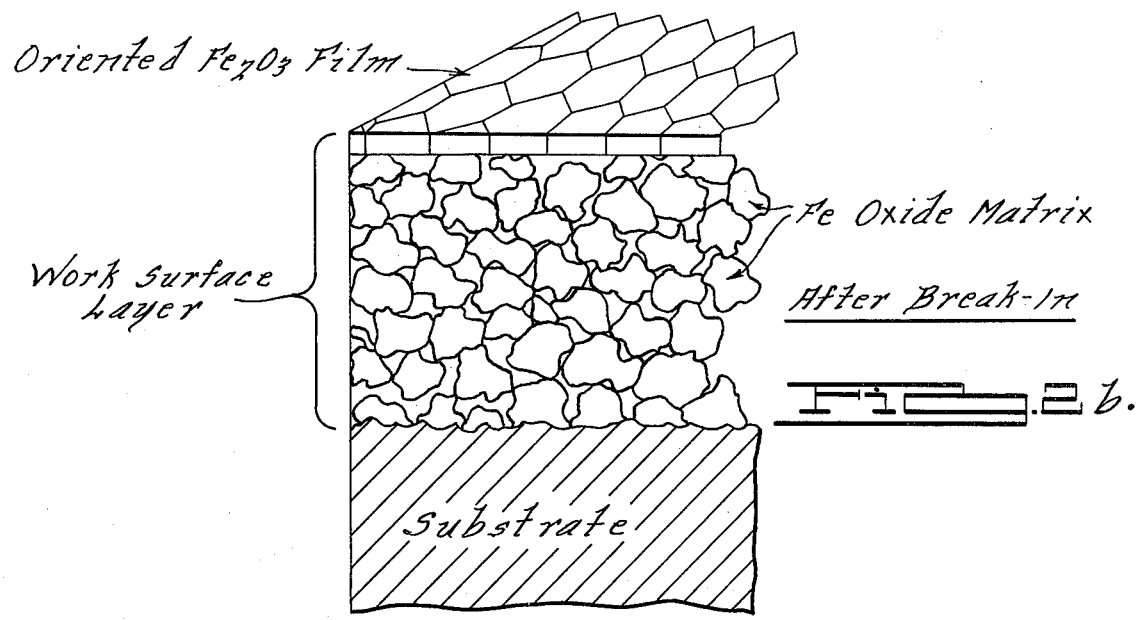

Referring to FIGS. 2a and 2b, it can be seen that the material forming the work surface, before break-in, comprises an iron oxide matrix which may be FeO, $Fe_2O_3$, $Fe_3O_4$ or any mixtures thereof. The interstices of the matrix include a trapping material consisting of an inorganic compound such as a salt or an oxide, various examples of which are given hereinbelow. The work surface layer may range over a wide variety of thicknesses depending on its use and may be applied to the substrate in various ways as will be described by way of example included hereinbelow. A member such as arm 22 may include a work surface layer such as that shown in FIG. 2a.

As already indicated, the ultimate working surface provided by this invention consists of a substantially continuous surface made up of high oriented $Fe_2O_3$ which is shown in FIG. 2b. However, this surface is best obtained after a run-in or break-in period between mating surfaces under elevated temperature and load.

In the case of an arm 22 having the work surface shown in FIG. 2a, the desired film as shown in FIG. 2b will be the result of a break-in accomplished by placing the arm against a mating surface, such as a regenerator core 10, either on the bench or in an actual engine and rotating the core causing it to rub against the arm. External heat may be applied or frictional heat may be generated. The use of both is preferred to aid in the film formation and transfer. Not only will the structure shown in FIG. 2b form on arm 22 but a substantially continuous film of oriented sintered $Fe_2O_3$ will also transfer probably along with some of the trapping material, to the surface of the core.

The material according to this invention may initially consist of a porous matrix of FeO, $Fe_3O_4$, or $Fe_2O_3$ and it will contain the interspersed trapping material. During run-in debris and oxide abrades from the working surface. The oxide transforms to $Fe_2O_3$ or remains as $Fe_2O_3$, whichever the case may be, and embeds itself in the trapping material in a substantially aligned condition to present the hexagonal crystal basal plane of $Fe_2O_3$ cells parallel to the sliding surfaces of the mating members. The debris and oxide also transfers and forms the $Fe_2O_3$ film on the mating members.

EXAMPLE 1

One way of obtaining the desirable ultimate $Fe_2O_3$ working surface is by flame spraying or plasma spraying $Fe_3O_4$ combined with common table salt (NaCl) using four parts by weight of iron oxide powder to one part by weight of salt on a 430 stainless steel substrate. 5–30% by weight salt is satisfactory. Spraying may be accomplished with a Metco-Powder metallizing Oxy-Acetelyne Gun for example. Following spraying the surface is washed with an aqueous bath to remove the table salt. The resultant porous $Fe_3O_4$ matrix is then impregnated with fused sodium sulfide ($Na_2S.9H_2O$). The fused sulfide is applied by pouring or painting it on the matrix and allowing it to soak into the matrix interstices. Any excess is then scraped off. The structure may then be heated to about 1200° F. to remove hydrated water. It is then ground substantially flat to provide a good running surface. After run-in in a gas turbine engine of a seal member prepared according to this procedure, a substantially continuous surface of oriented $Fe_2O_3$ was formed over the matrix work surface. A regenerator hot cross arm prepared in this fashion was observed to have an $Fe_2O_3$ film transferred to the regenerator core surface.

These materials exhibit desirable wear and friction characteristics.

EXAMPLE 2

Gas turbine regenerator hot cross arms and hot seal rims prepared as in Example 1 were converted from $Fe_3O_4$ to $Fe_2O_3$ by using controlled break-in cycles at controlled temperatures in test fixtures and in actual gas turbine engines. The following schedules are typical of the cycles used for break-in or run-in of such seal members.

| Running Fixture | | SCHEDULES | | |
|---|---|---|---|---|
| | | Conditions | | |
| Time, Mins. | | | | |
| Sched. "A" | Sched. "B" | $P_1'$ | $T_1$° F. | $T_R$° F. |

-continued

| 15 | 30 | 10.7 | 130 | 600 |
| 15 | 30 | 16.6 | 130 | 950 |
| 15 | 30 | 25.7 | 450 | 1200 |
| 15 | 30 | 38.8 | 450 | 1200 |
| 15 | 30 | 55.5 | 450 | 1275 |
| 15 | 30 | 78.5 | 450 | 1350 |

Engine
SCHEDULE "H"

| | |
|---|---|
| 1. 1 hour at idle (23,000–24,000 rpm) | $T_8$-900 to 950° F. |
| 2. 1 hour at 70% speed while matching | $T_8$-1120 to 1150 to 1200° F. |
| 3. 1 hour at 80% speed | $T_8$-1200° F. |
| 4. 15 minutes at 90% speed | $T_8$-1200° F. |
| 5. 15 minutes at 95% speed | $T_8$-1200° F. |
| 6. 15 minutes at 97½% speed | $T_8$-1200° F. |
| 7. 15 minutes at 97½% speed | $T_8$-1275° F. |
| 8. 15 minutes at 97½% speed | $T_8$-1350° F. |

SCHEDULE CONDITIONS DEFINED $P_3'$ = pressure in inches of Hg of cold gas entering regenerator as at 24 in FIG. 1.
$T_3°$ F = temperature of the cold gas entering regenerator as at 24 in FIG. 1.
$T_8°$ F = temperature of the hot gas entering the hot inner face of the regenerator of FIG. 1.

EXAMPLE 3

A body consisting of 86% iron, 4% copper and 10% carbon (as taught in the previously mentioned U.S. Pat. No. 3,142,894) was heat treated at 1000° F. to form a mixed surface of $Fe_3O_4$ and iron thereon. The metallic iron was removed from the surface with an electrolytic etchant (5% HBF solution) and the resultant matrix of $Fe_3O_4$ was filled with fused sodium sulfate as in example 1. Sodium sulfide ($Na_2S \cdot 9H_2O$) has also been used. Heating in excess of 900° F. removed hydrated water and subsequent run-in converted the surface of the $Fe_3O_4$ to the oriented $Fe_2O_3$ film to provide the desired substantially continuous oriented $Fe_2O_3$ film on the working surface.

EXAMPLE 4

Figure 3:
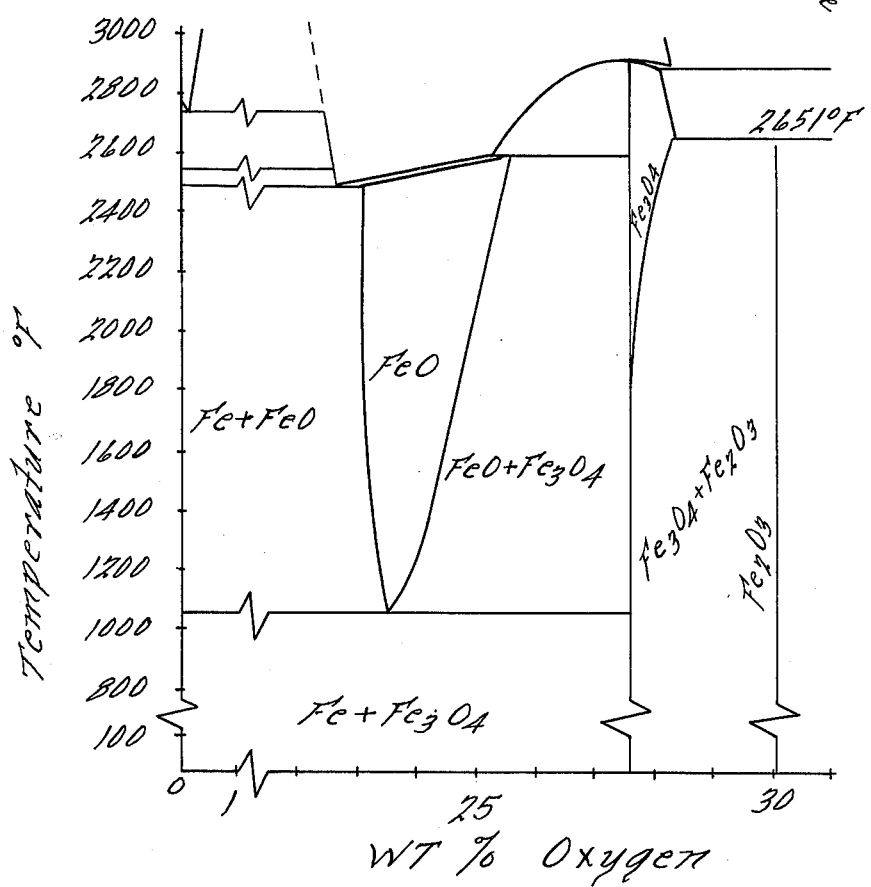
FIG. 3 is a phase diagram showing the formation of the various iron oxides under various conditions of temperature and percent oxygen atmosphere.

$Fe_3O_4$ was formed in situ in the case of a wrought iron substrate base material. Under conditions wherein the temperature and % oxygen atmosphere are controlled, three distinct layers of iron oxide form on such a material. As shown in the Phase Diagram of FIG. 3 an outer layer of $Fe_2O_3$, an intermediate layer of $Fe_3O_4$ and an inner layer of FeO form.

Removal of the $Fe_2O_3$ layer by grinding to expose $Fe_3O_4$ and the subsequent coating thereof with sodium sulfide provides a low friction high wear surface after a run-in against a stainless steel mating surface at a temperature of about 1000° F. Instead of removing the $Fe_2O_3$ surface, it may be directly coated with the trapping material but the run-in is more abrasive.

Several observations may be made concerning the above examples. Abraded debris is collected by the trapping material. The debris consists primarily of $Fe_2O_3$ particles which embed themselves in the trapping material in the oriented position to provide a substantially continuous film. They sinter together during break-in. The surface after run-in consists of a substantially continuous layer of hexagonal $Fe_2O_3$ crystals substantially highly oriented with their basal planes substantially parallel to the rubbing surface. A complementary working surface layer or film forms on the mating surface.

Since the desired $Fe_2O_3$ matrix cannot be obtained to any great depth by direct oxidation, an $Fe_3O_4$ or FeO matrix may be used initially with the $Fe_2O_3$ film forming during run-in as described in some of the examples above. However, $Fe_2O_3$ may also be sprayed as by flame spraying or with a plasma torch followed by impregnation with a suitable trapping material.

The most preferred method of forming the initial matrix was found to be flame spraying wherein a mixture of $Fe_3O_4$ particles and the trapping material were sprayed directly on the substrate thus eliminating the impregnation step. For example, many regenerator seal members have been prepared by spraying a mixture consisting of $Fe_3O_4$ and about 10% by weight of $Na_3PO_4$.

The following table contains examples of several trapping material compounds typical of those which may be used in accordance with this invention, the $Na_3PO_4$, $Na_2S$ and $Na_2SO_4$ being especially preferred. The hydrated forms may be used also, particularly where impregnation is used.

| | |
|---|---|
| $BaSO_4$ | $Na_2S$ |
| $CdSO_4$ | $Na_2HPO_4$ |
| CaO | ZnS |
| $Ca_2P_2O_7$ | ZnO |
| $CaSO_4$ | $TiO_2$ |
| $MnSO_4$ | $CaF_2$ |
| $Na_3PO_4$ | $NaBO_2$ |
| $Na_2SO_4$ | |

The general characteristics of a trapping material according to this invention are:
1. It must have a melting point in excess of the maximum service temperatures.
2. It must not be substantially abrasive as to the mating surfaces.
3. It must be softer than the particles which are to be trapped.
4. In some cases, as in turbine engines, it should not be corrosive.
5. It should not be hygroscopic.
6. It is desirable that it be sprayable for flame or plasma spraying.

Generally, the thickness of the working surface layer will depend on the use to which it is directed. Having described the invention, it is to be defined according to the following claims.

What is claimed is:

1. A member having a substrate and a working surface layer carried thereon, the working surface layer comprising:
   a matrix consisting substantially of $Fe_3O_4$, the matrix containing an interspersed particle and debris trapping material therein, and
   a substantially continuous film made up substantially of oriented $Fe_2O_3$ overlaying the matrix.

2. A member having a substrate and a working surface layer carried thereon, the working surface layer comprising:
   a matrix consisting substantially of an iron oxide selected from the group consisting of FeO, $Fe_3O_4$, $Fe_2O_3$, and mixtures thereof, the matrix containing an interspersed particle and debris trapping material therein, and
   a substantially continuous film made up substantially of oriented $Fe_2O_3$ overlaying the iron oxide matrix, and
   wherein the trapping material is selected from the group consisting of $BaSO_4$, $CdSO_4$, $Ca_2P_2O_7$, $CaSO_4$, $MnSO_4$, $Na_3PO_4$, $Na_2SO_4$, $Na_2S$, $Na_2HPO_4$, ZnS, ZnO, TiO$_2$, CaF$_2$, NaBO$_2$ and mixtures thereof.

3. A member having a substrate and a working surface layer carried thereon, the working surface layer comprising:
 a matrix consisting substantially of an iron oxide selected from the group consisting of FeO, Fe$_3$O$_4$, Fe$_2$O$_3$, and mixtures thereof, the matrix containing an interspersed particle and debris trapping material therein, and
 a substantially continuous film made up substantially of oriented Fe$_2$O$_3$ overlaying the iron oxide matrix, and
 wherein the trapping material is selected from the group consisting of inorganic oxides, inorganic sulfides, inorganic sulfates, inorganic phosphates, inorganic fluorides and mixtures thereof.

4. A material for use in dry lubricated systems, the material being carried on a substrate and having a working surface comprising an iron oxide matrix selected from the group consisting of FeO, Fe$_3$O$_4$ and mixtures thereof, the oxide matrix containing an interspersed trapping material whereby a substantially continuous outer layer of Fe$_2$O$_3$ is formed under conditions of friction and wear.

5. The combination according to claim 4 wherein the oxide is Fe$_3$O$_4$.

6. The material according to claim 4 wherein the particle trapping material is an inorganic compound.

7. A method of providing a working surface for a substrate member intended for use in a dry lubricated system comprising:
 providing an iron oxide matrix containing an interspersed debris trapping material on a surface of the substrate;
 placing the matrix surface against a mating member;
 moving the members against each other in sliding and rubbing relationship under pressure to cause abrasion of particles of the iron oxide from the matrix along with some of the trapping material, and
 maintaining the relative movement of the members substantially continuous until a film of oriented Fe$_2$O$_3$ forms over the oxide matrix.

8. The method according to claim 7 wherein the relative movement of the member is maintained until a substantial film of substantially oriented Fe$_2$O$_3$ is transferred to the mating member.

9. The method according to claim 7 wherein the movement of the members is accomplished under conditions of elevated temperature.

10. The method according to claim 9 wherein the movement is accomplished in an oxidizing environment.

11. The method according to claim 7 wherein the initial oxide matrix is formed on the substrate by flame spraying or plasma spraying an iron oxide power.

12. The method according to claim 11 wherein the oxide powder is mixed with a trapping material prior to spraying.

13. The method according to claim 12 wherein the oxide is Fe$_3$O$_4$.

14. The method according to claim 13 wherein the trapping material is selected from the group consisting of Na$_3$PO$_4$, Na$_2$S, Na$_2$SO$_4$ and mixtures thereof.

* * * * *